May 2, 1961 W. R. STELLING, JR 2,982,187
BAG MAKING MACHINE
Filed June 12, 1958 4 Sheets-Sheet 1
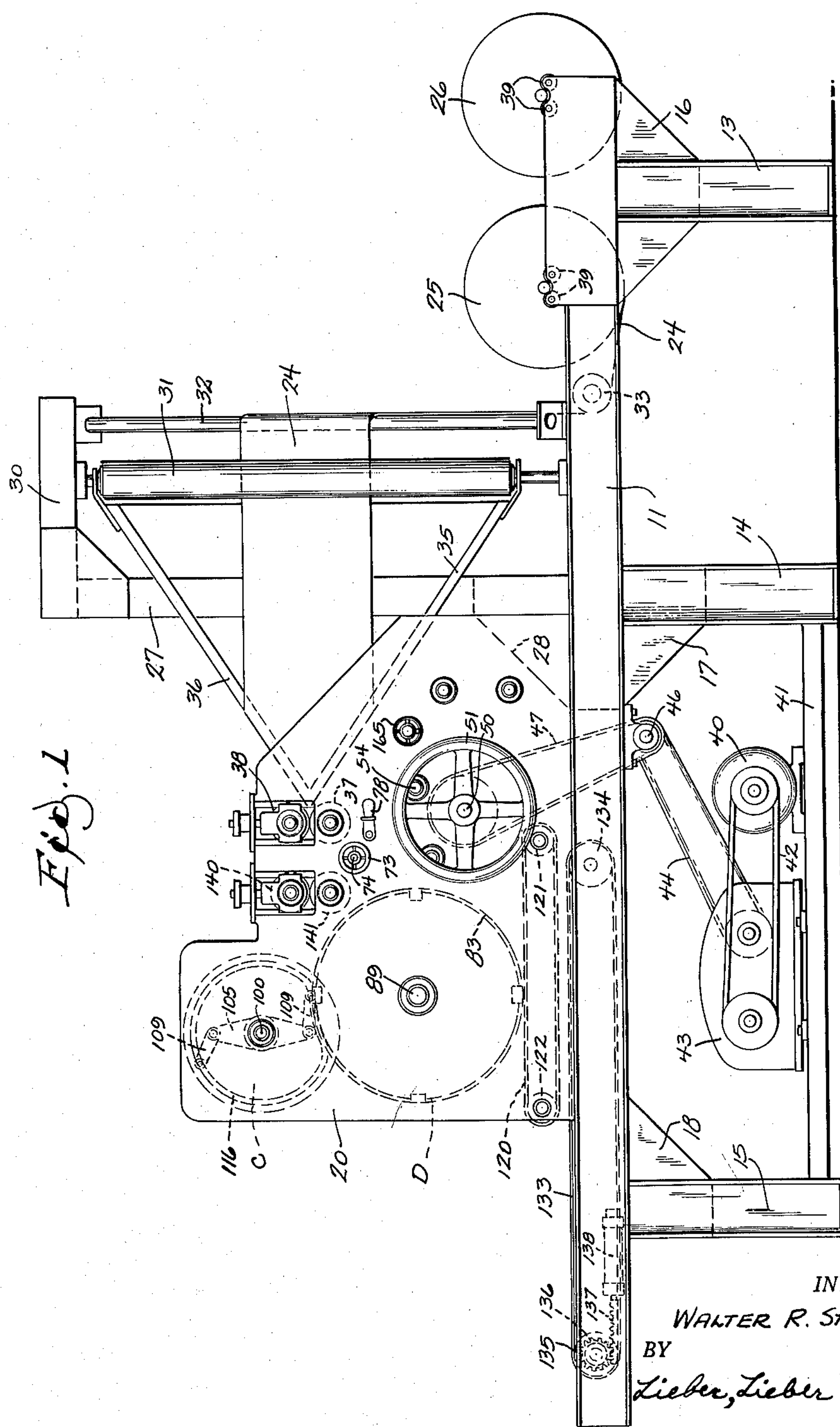
INVENTOR.
WALTER R. STELLING, JR.
BY
Lieber, Lieber & Nilles
ATTORNEYS

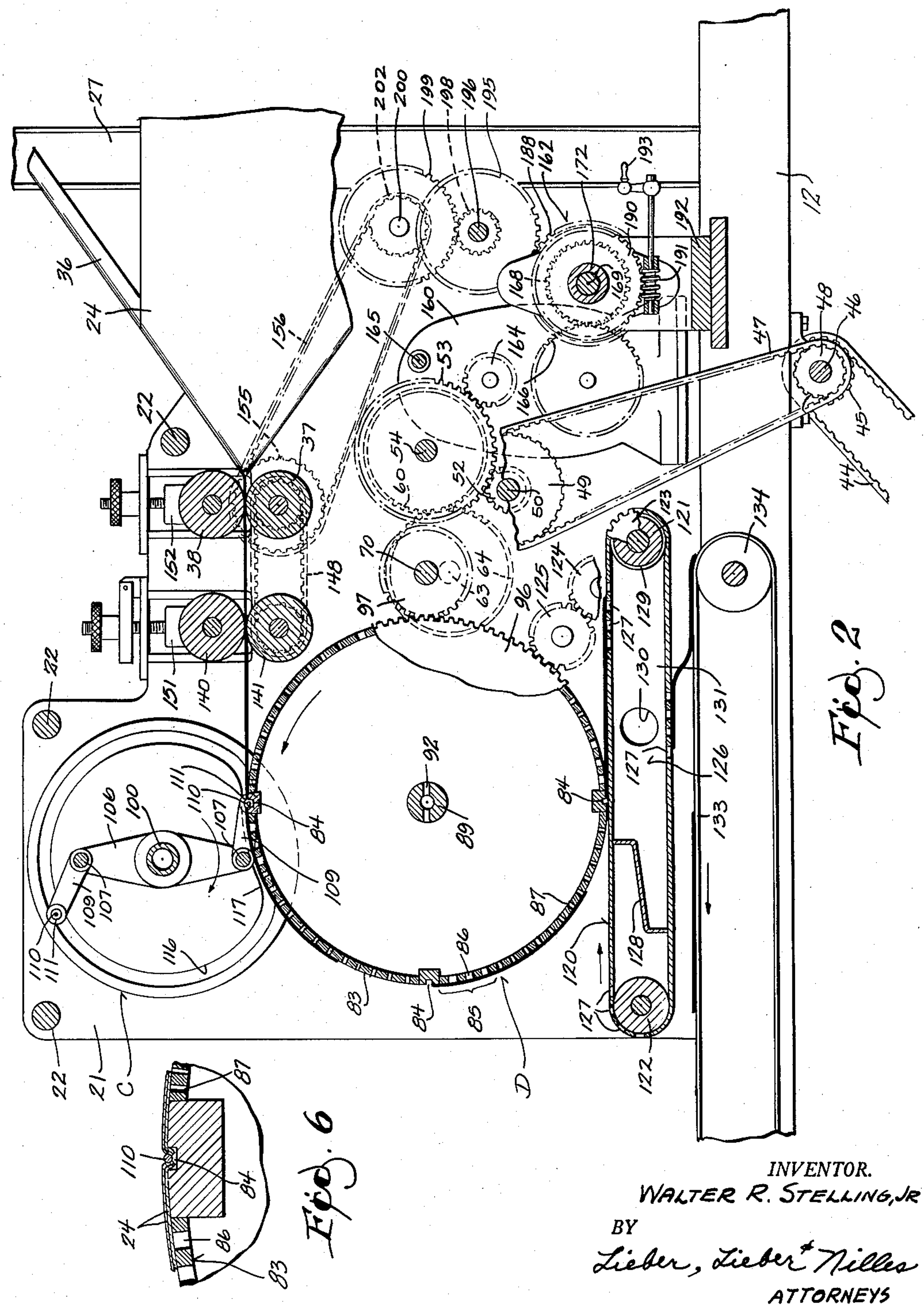
INVENTOR.
WALTER R. STELLING, JR
BY
Lieber, Lieber & Nilles
ATTORNEYS

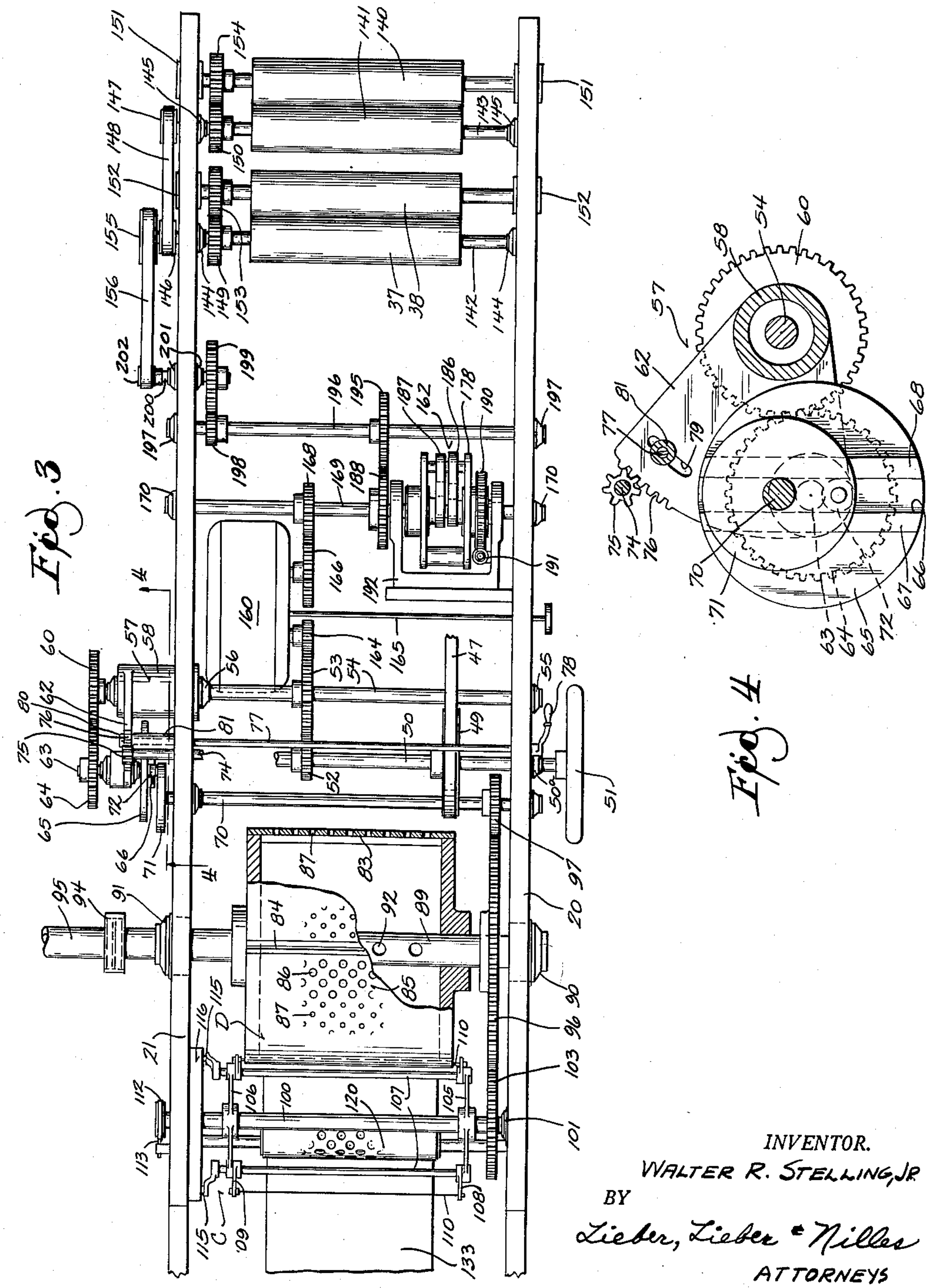
INVENTOR.
WALTER R. STELLING, JR.
BY
Lieber, Lieber & Nilles
ATTORNEYS BAG MAKING MACHINE
Filed June 12, 1958 4 Sheets-Sheet 4
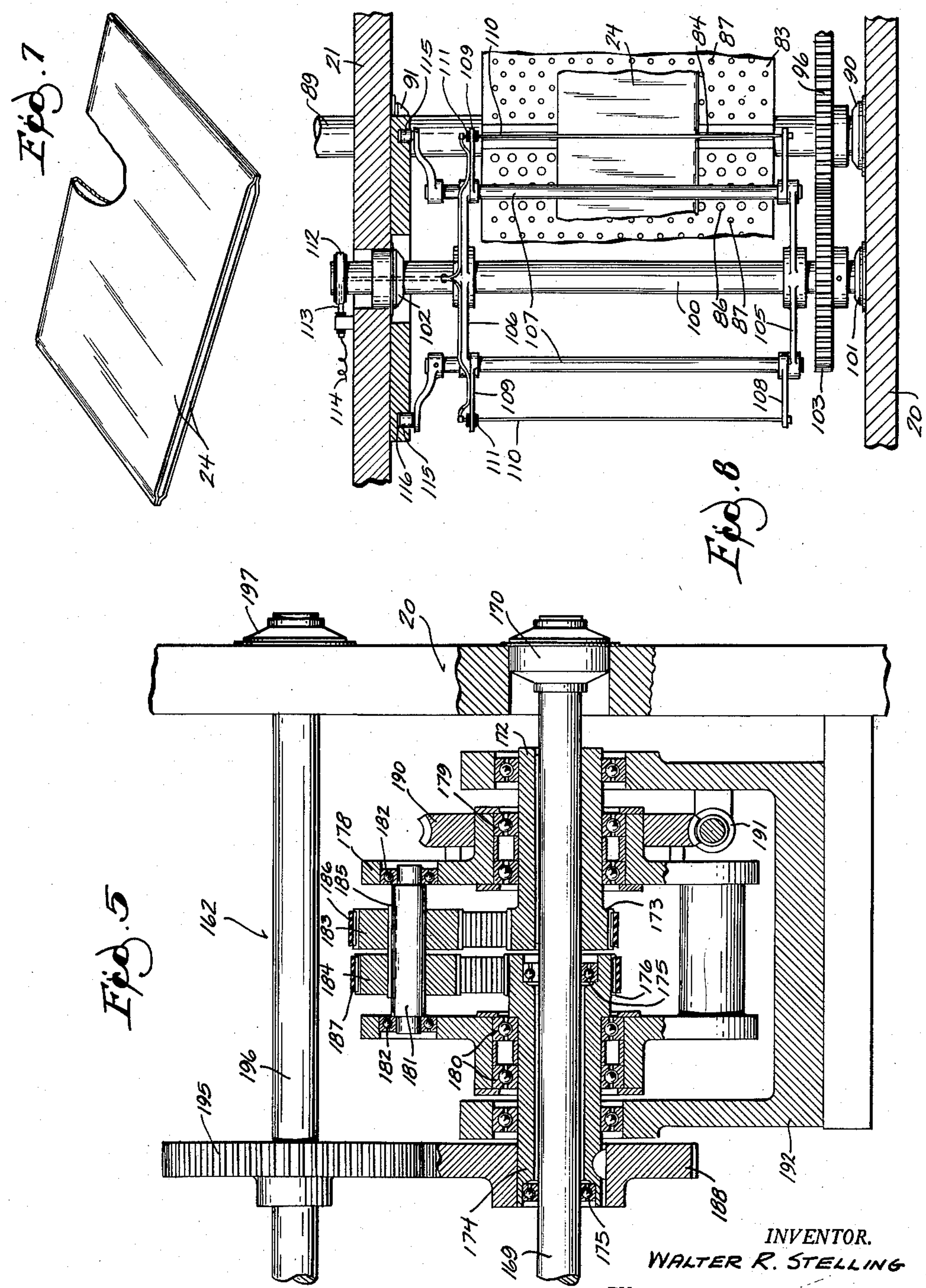
INVENTOR.
WALTER R. STELLING
BY
Lieber, Lieber & Nilles
ATTORNEYS 2,982,187
Patented May 2, 1961

2,982,187

BAG MAKING MACHINE

Walter R. Stelling, Jr., Milwaukee, Wis., assignor to Faustel, Inc., Butler, Wis., a corporation of Wisconsin Filed June 12, 1958, Ser. No. 741,594

10 Claims. (Cl. 93—8)

This invention relates generally to machines for making bags from rolls of flexible and heat sealable material.

Machines of this general character have been used in which a rotary drum transfers the pre-cut piece of flexible material while one edge is sealed by a heat member on the drum. Other prior art machines use an oscillating type drum for holding the bag which is being formed.

These prior art devices, however, have required additional devices such as cooperating belts and transfer means to aid the drum in conveying the material, or they have required separate means for cutting the web into proper lengths.

It is highly desirable and, in fact, economically necessary in this art to be able to produce these bags at a very rapid rate with minimum malfunctioning of the machine. On the other hand, however, it is necessary to give the heat sealing means sufficient contact time with the material to be able to form a proper seal. Once this seal has been made, it should not be placed under tension until it has cooled sufficiently to prevent its distortion. It is therefore one object of the present invention to provide a bag making machine having these desirable characteristics.

One of the most common sources of trouble in machines of this general type is the improper or varying amount of tension on the web. Accordingly, one object of the present invention is to provide a bag making machine in which the web is constant as to speed and tension. As a result, it is possible to maintain proper settings for the various parts of the machine and thereby utilize higher speeds for the web and also provide positive and accurate folding of the web prior to the bag forming operation.

In accordance with the present invention, a bag making machine has been provided having a transfer drum on which the material is simultaneously both cut and sealed. The drum continuously rotates in one direction but slows down during the cutting and sealing operation and speeds up during the transferring operation. The result is to give the heat sealing and cutting means sufficient time to form a good seal and then the material is quickly transferred to the next position.

More specifically, the invention contemplates a transfer drum of the above type which holds the material on the drum by suction. The drum, during the faster transferring operation, acts to maintain the web taut as it comes from the feed rolls.

The invention generally provides a high-speed bag making machine which has no reciprocating parts and in which the web of material flows at a constant speed onto the drum and in a continuous strip and emerges therefrom as a completed bag, the entire travel of the material from a stock roll to the stack of finished bags being of a smooth flow pattern with no reciprocatory movement or excessive handling thereof.

It is also an object of this invention to provide a bag making machine having a uni-directional rotating suction drum on which the bags are formed and also having a suction belt for contacting said drum and removing the finished bags therefrom.

Another object of the invention is to provide means for driving the suction drum and sealing means separately from the draw rolls drive mechanism, whereby the speed of suction drum and sealing means may be alternately decreased and increased for every bag forming operation while the draw rolls are driven at a constant speed. In addition, the draw rolls drive mechanism includes means by which the speed of the draw rolls may be momentarily changed so as to properly position the web of material in respect to the drum. This latter adjustment is necessary when forming bags of pre-printed stock so that the printed matter appears in the proper location on the finished bag.

Still another object is to provide an improved belt-driven compensator. A compensator made in accordance with this invention is used to transmit drive to the draw rolls of a bag making machine of the above type. By means of this compensator, when used, for example, with a bag making machine of the present type, the speed of the draw rolls may be momentarily changed to properly position the web of pre-printed material in respect to the cutting and sealing means. The improved belt-driven compensator contemplated by this aspect of the invention is more accurate than conventional compensators, requires no lubrication and does not need to be enclosed.

These and other objects and advantages of the invention will appear later as this disclosure progresses, reference being had to the accompanying drawings, in which:

Figure 1 is a right side elevational view of a machine made in accordance with the present invention;

Figure 2 is a fragmentary view of the device as shown in Figure 1 but on an enlarged scale, certain parts being in section, broken away or removed for the sake of clarity;

Figure 3 is a modified plan view of the device shown in Figure 1, but on a slightly enlarged scale, and the view being more or less schematic and exploded to more clearly illustrate the various driving means;

Figure 4 is a sectional view taken on line 4—4 of Figure 3, but on an enlarged scale, showing the adjustable means for varying the speed of the suction drum;

Figure 5 is a horizontal sectional view through the compensator as shown in Figure 3, but on an enlarged scale;

Figure 6 is a fragmentary sectional view of the drum and one of its transverse slots with the cutting and sealing wire therein;

Figure 7 is a perspective view of a bag made by the machine of the present invention, a portion of the bag broken away for clarity; and Figure 8 is a plan view of the cutting and sealing means shown in Figure 1 but on an enlarged scale, certain parts being shown in section or broken away.

Referring in greater detail to the drawings, the main frame of the machine comprises the back-to-back channel iron members 11, 12 arranged in parallelism and having bolted or otherwise secured thereto the pair of front legs 13, an intermediate pair of legs 14 and a pair of rear legs 15. The pairs of gusset plates 16, 17 and 18 are bolted between the channels and the legs and reinforce the frame. Two parallel and vertically positioned sides 20 and 21 are fabricated from heavy plate steel and are welded to the upper side of their respective channel members 11 and 12. Cross bars 22 extend between the sides and rigidly secure them together.

An upwardly extending structure is provided for guiding the web of material 24 from the supply rolls 25, 26 into the bag making part of the machine. This structure includes a vertical post 27 secured at one side of the machine on channel 12 and reinforced by gusset plate 28 and having an arm 30 extending parallel to and above the channel 12. A vertical roller 31 is rotatably mounted on a shaft which extends between the channel 12 and arm 30. A bar 32 is positioned ahead of the roller 31 and at an angle of about 45 degrees from the horizontal. This bar is mounted at its upper end on arm 30 and at its lower end on channel 11. A horizontal guide roller 33 is rotatably mounted between the channels 11 and 12.

The web 24 of thermoplastic material being fed through the machine is of the heat sealable type, such as Pliofilm, Saran or the like, and is taken off either one of the supply rolls 25 or 26, trained under roller 33 and then over bar 32. Bar 32 acts to turn the web from the horizontal to the vertical position. After passing over the bar 32, the web goes around the vertical roller 31 located at the side of the machine and is then folded over the guide bars 35, 36 which converge in front of the creasing rolls 37, 38, to be described later.

The supply rolls 25, 26 are mounted on anti-friction rollers 39 and rollers 31 and 33 are mounted on anti-friction bearings (not shown) which permit the web to move at a high rate of speed.

The driving power for the entire machine is furnished by the constant speed electric motor 40 which is secured to the platform 41 mounted between legs 14 and 15. Motor 40 transmits power through belt 42 to the conventional variable speed drive unit 43. This unit 43 is effective to change the speed of the entire machine to accommodate various gauges of the material from which bags are being made. In other words, a light gauge material will heat seal faster than a heavier gauge, for any given amount of heat, and therefore, the machine can be operated somewhat faster for lighter gauge material.

Power is transmitted from the unit 43 through the toothed belt 44 and sprocket 45 to the lay shaft 46 which is rotatably mounted across the underside of channels 11 and 12. Another toothed belt 47 meshes with a sprocket 48 (Fig. 2) on shaft 46 and transmits the power to the larger sprocket 49 fixed to the main drive shaft 50 of the machine. Shaft 50 is mounted in an anti-friction bearing assembly 50*a* (only one shown—Fig. 3) carried in each of the sides 20, 21, and has a large handwheel 51 secured to its end at the side of the machine. Intermediate the length of shaft 50 is fixed a pinion gear 52 which is in constant mesh with a larger gear 53. Gear 53 is secured to the shaft 54 rotatably mounted at one end in anti-friction bearing assembly 55, carried in side wall 20. The other end of shaft 54 is rotatably mounted in an anti-friction bearing assembly 56 which is secured in one end of a large crank casting 57.

Means are provided for rotating the suction drum assembly and its synchronized cutting and sealing assembly C at alternately fast and slow speeds as follows. As shown best in Figures 3 and 4, the casting 57 is oscillatingly mounted in the side 21 by its cylindrical portion 58 which extends therethrough. Shaft 54 extends through the crank casting and has a gear 60 secured to its outer end.

The casting 57 also includes a plate-like arm 62 in the free end of which is rotatably supported a shaft 63. On one end of this shaft a gear 64 is fixed which is in constant mesh with gear 60. A plate 65 is fixed to the other end of this shaft, which plate has a guide track 66 on its inner face defined by a pair of parallel and spaced bars 67, 68 secured to the plate.

Another shaft 70 is rotatably mounted in suitable anti-friction bearings in sides 20, 21, which shaft has a plate 71 secured to its outer end. A follower roller 72 is rotatably secured to plate 71 in eccentric relation to shaft 70 and is engaged in the guide track 66. The eccentric drive thus provided for shaft 70 causes the latter to have a slow and a high speed for each revolution it makes.

The casting is oscillatably adjustable by rotation of handwheel 73 (Fig. 1) on one end of shaft 74 which causes the pinion 75 on the other end of the shaft to rotate the casting through its toothed segment 76 (Fig. 4), to thereby vary the degree of eccentricity of roller 72 with respect to shaft 63. The amount of this eccentricity determines the differential between the fast and slow speeds of the drum as will appear.

Means are also provided for locking the casting 57 in any one of its adjusted positions. This means takes the form of a control rod 77 having a lever 78 threadably engaged on one end and which extends through an arcuate slot 79 (Fig. 4) and has a nut or stop 80 on its other end which bears against the casting arm. A sleeve or spacer 81 is provided on rod 77 and between the arm 62 and the side 21. As the lever is rotated in one direction in its threaded connection to the rod 77, the rod 77 is drawn into the lever slightly thereby causing the casting arm to bear tightly against the side 21 through the sleeve 81, and thus locking the casting in position. Rotation of the lever slightly in the other direction loosens the rod and eliminates the binding action of the arm against the sleeve and permits the casting to be adjusted by handwheel 73.

With above construction, the constant speed of rotation of the drive shaft 54 is converted into alternately fast and slow speeds of rotation of shaft 70, and the differential between these speeds is adjustable and depends on the amount of eccentricity of the roller 72 in respect to the shaft 63 as determined by the position to which casting 57 is adjusted.

The suction drum assembly D comprises a cylindrical drum 83 having a plurality, for example four, of circumferentially spaced and transversely disposed web back up members which are adapted to be contacted by a heated element, as will appear. These back-up members have been shown as slots 84 equally spaced around the drum circumference. The drum is adapted to rotate in the direction, as indicated by the curvilinear arrow, and its periphery contains four separate areas 85 of relatively large perforations 86, one of each of these areas being adjacent the forward side, in respect to the direction of drum rotation, of each of the slots 84. The remaining areas of the drum periphery are perforated with smaller holes 87. A greater suction effect is thereby created in the areas 85 of the drum periphery than on the remaining portions.

The drum assembly also includes a hollow shaft 89 to which the drum is fixed, which shaft is rotatably mounted in anti-friction bearings 90, 91 in sides 20, 21, respectively. That portion of the shaft located within the drum contains a series of apertures 92 which place the inside of the drum in communication with the interior of the shaft. Conventional means (not shown) are provided for creating a suction within the drum through its hollow shaft 89, the latter being provided with a sealing joint 94 which permits rotation of the shaft 89 but allows the vacuum conduit 95 which is connected thereto to remain stationary.

A large gear 96 is also secured to shaft 89 and is in constant mesh with the smaller gear 97, fixed on shaft 70. Gear 96 has a pitch line diameter equal to the diameter of drum 83 and makes four revolutions for every revolution of gear 97. As a result, the drum alternately speeds up and slows down four times during each of its revolutions. With the arrangement shown, four bags are formed for each revolution of drum 83. Shafts 50 and 54 make one revolution per bag.

Cutting and sealing means C are synchronized for operation with the suction drum as follows. A shaft 100 is rotatably mounted in bearings 101 and 102 in sides 20 and 21, respectively, and has a gear 103 fixed thereto for constant mesh with gear 96. The relative size of gears 96 to 103 is such that gear 103 makes two revolutions for each revolution of gear 96. Arms 105 and 106 are secured intermediate their length at axial spaced locations along shaft 100. A rod 107 is secured between each of the aligned ends of arms 105 and 106 and a pair of spaced arms 108, 109 are pivotally mounted on each rod 107. An electric wire 110 is insulatingly mounted between the arms 108 and 109 in the porcelain insulator 111 in each of these arms and these wires extend inwardly through the center of shaft 100 and are connected at their ends to the commutator 112 secured on the end of shaft 110. A brush 113 is secured to the machine frame to provide continuous electrical contact with the commutator. Wire 114 furnishes electrical energy to the brush 113 from a source (not shown) and causes the wires 110 to become hot. The frame of the machine itself furnishes the return as only a small voltage, for example 10, is required to heat the wires.

A cam follower 115 is eccentrically secured to one end of each of the rods 107 and is in axial alinement with the wire 110 located between the insulators 111. A cam track 116 is provided in which the followers 115 are adapted to ride. The cam track is stationary and has an arcuate portion 117 which coincides and is in axial alignment with the periphery of the drum and more particularly with the upper portion of the path of travel of the slots 84.

The timing of the speeds of rotation of shafts 89 and 100 is such that one of the cutting and sealing wires 110 will enter the slots 84 and remain therein during the travel of the follower 115 in the track portion 117. It is also during this interval of time that the shafts 89 and 100 rotate at their slow speeds due to the action of eccentric drive means. In this manner the hot wire 110 is given sufficient time to cut and form a good seal across the folded web 24. After this is done, the speed of the drum and rotary cutting and sealing means are increased to thereby rapidly transfer the incoming web for the next cutting and sealing operation.

As will appear more fully hereinafter, this increased speed of the drum also acts to draw the web tightly and maintain it taut as it comes from the draw rolls, to be described.

A suction transfer belt 120 is trained over rollers 121 and 122 which are mounted in the sides 20, 21. Roller 121 has a gear (not shown) secured therewith which, through the intermediate constant mesh gears 124 and 125, is driven by the drum gear 96, and therefore at the same varying speeds as the drum. The suction belt 120 contains three perforated areas 127 which extend across the width of the belt and the suction within the belt acts through these perforated areas to hold the leading edge of the bags thereon.

A suction chamber 126 is provided between the upper and lower flights of the belt and has a cut-off wall 128 which defines one end of the chamber. The other end of the chamber is defined by roller 121 which has a series of grooves 129 around its periphery so that the suction is effective to hold the bags on the perforated belt as the latter passes around the roller. A conduit 130 is connected to one side 131 of the suction chamber to place the latter in communication with the means (not shown) for supplying the suction. As the perforated portion of the belt passes the wall 128 the bag is freed from influence of the suction and is free to drop off.

A take-away belt 133 is positioned directly beneath the suction belt and is trained over rollers 134 and 135 which are rotatably mounted between the channels 11, 12. Roller 135 has a pinion 136 secured therewith which meshes with the rack 137 of the double-acting hydraulic cylinder and piston unit 138. The other end of the unit 138 is secured to the machine frame and acts to periodically move belt 133 and transfer the accumulated pile of bags to a location where they can be readily removed.

Draw rolls 140 and 141 are provided for pulling the web from the supply roll and through the machine onto the suction drum. These draw rolls are located directly behind the creasing rolls 37, 38 and are parallel thereto. The lower creasing roll 37 and the lower draw roll 141 are mounted by their respective shafts 142 and 143 in suitable anti-friction bearings 144 and 145, respectively, in the sides 20 and 21. Shafts 142 and 143 are provided with a sprocket 146, 147 respectively, which are connected together by a toothed belt 148. The shafts 142 and 143 also have a pinion 149, 150, respectively, fixed thereon.

The upper draw roll 140 and upper creasing roll 38 are rotatably mounted in their pairs of manually adjustable bearing blocks 151 and 152, respectively, by which their pressure against their corresponding roller can be adjusted. These upper rollers 38 and 140 have gears 153, 154, respectively, which are in constant mesh with gears 149 and 150.

Shaft 142 also has another sprocket 155 secured on its end and over which is trained the belt 156 which transmits power for power driving the roller 37 which in turn drives the other rollers in synchronism therewith.

The creasing rollers act to crease the web of material that is folded immediately before it enters these rollers. The draw rollers furnish the force for moving the web from the supply roll to the suction drum at a constant rate of speed.

The speed of rotation of the draw rollers determines the length of the bag formed by the machine. In other words, the speed of the draw rolls determines the rate at which the web is fed onto the suction drum, that is, the length of the web that the drum is permitted to take between its cut-off slots. The speed of the draw rollers is determined by the setting of the adjustable gear box 160, to be presently described.

An adjustable means or compensator 162 is provided between the gearbox 160 and the draw rolls for the purpose of momentarily changing the speed of the latter. This adjustment is necessary when the bags are formed from pre-printed stock and in which case the printed matter must appear in a certain location with respect to the edges of the bag. By momentarily increasing or decreasing the speed of the web being fed to the drum, the web is adjusted relative to the cut-off slots on the drum, and the printed matter on the web is thereby correctly positioned in respect to these slots.

The above mentioned gearbox 160 and the compensator 162 are connected to the draw rollers as follows.

The gearbox 160 is of conventional design and is commonly referred to as a "P.I.V.," meaning "positively infinitely variable." The gearbox 160 has a pinion 164 in constant mesh with gear 53 which furnishes a constant input speed to the gearbox. By means of the manually adjustable control 165, the output speed of the gearbox, that is gear 166, may be readily varied to change the speed of the draw rolls and consequently the length of the bags being formed.

Power is transmitted from gear 166 to the gear 168 fixed to shaft 169. Shaft 169 is rotatably mounted in anti-friction bearing units 170 carried by sides 20 and 21. The compensator 162 is supported on this shaft and operates as follows.

A sleeve 172 is keyed to shaft 169 for rotation therewith and has a toothed pulley 173 formed integrally thereon. Another sleeve 174 is rotatably supported on shaft 169 by anti-friction bearing assemblies 175 and this sleeve also has a toothed pulley 176 formed integrally thereon. A yoke 178 is oscillatably mounted on sleeves 172 and 173 by bearing units 179 and 180, respectively. A stub shaft 181 is rotatably mounted on anti-friction bearing units 182 in one end of yoke 178 and toothed pulleys 183 and 184 are fixed to this shaft by key 185. A toothed belt 186 is trained around gears 173 and 183 and toothed belt 187 connects pulleys 176 and 184. Belts 186 and 187 are of the same length and contain the same number of teeth.

The relative sizes of the pulleys of the compensator are as follows. Pulley 173 and pulley 183 are the same size and have the same number of teeth. Pulley 184 has one tooth less than does pulley 183 and pulley 176 has one tooth more than pulley 183. As a result, the sleeve 174 and the output gear 188 fixed thereto, turn slightly slower than does shaft 169. If the yoke is stationary, the output speed of the compensator remains constant.

Means are provided for rotating the yoke in one direction or another for momentarily increasing or decreasing the output of the compensator as follows.

A pinion 190 is fixed to one side of the yoke 178 and a worm gear 191 is secured to the stationary frame member 192 for engagement with the pinion 190. The worm 191 is manually adjusted by the crank handle 193. The worm could be supported directly on the side 20 rather than on the yoke 192. However, this compensator as shown is installed as a complete unit and finds utility in other machines also. Therefore, with the arrangement shown, the compensator can be readily installed as a complete and integral package for other machines.

The operator in turning the crank 193 in one direction or the other causes the yoke 178 and the pulleys 183, 184 carried thereby to revolve around the shaft 169 in one direction or the other, thus momentarily changing the rotational speed of output gear 188 in respect to that of the input shaft 169.

Gear 188 is in constant mesh with gear 195 which in turn is fixed to shaft 196. Shaft 196 is rotatably mounted in a bearing 197 carried by each of the sides 20 and 21. A gear 198 is also fixed to shaft 196 which constantly meshes with gear 199 on one end of stub shaft 200. Shaft 200 is mounted in an anti-friction bearing 201 in side 21 and a pulley 202 is secured at its other end and over which is trained the belt 156.

The compensator 162 provided by this invention permits ready adjustment of the web in the machine in respect to the suction drum 83. The use of timing belts 186 and 187, rather than gears as in conventional compensators, is particularly advantageous in several respects. First of all, and importantly a more accurate adjustment is possible because of the elimination of any looseness in the unit due to backlash. Furthermore, this compensator requires no lubrication and enclosure and this is desirable from a maintenance and service standpoint. The compensator may be conveniently inserted in existing machines as an integral package, and may be adjusted by various means such as conventional electric eye pickup device, rather than by the manual crank adjustment 193 which has been shown for illustrative purposes.

*Résumé*

The web of flexible and heat sealable material is fed from one of the supply rolls, over the folding guides 35, 36, through the creasing rolls 37, 38 and then into the draw rolls 140 and 141. The speed of the web up to and through the draw rolls is constant, but is adjustable by the gearbox 160. The speed of the web determines the length of the bags produced and the present machine is capable of handling a web speed of 450 feet per min te, and thus forming 300 bags of 18 inch length per minute. Three hundred bags of a six-inch length would be produced by cutting the web speed down to 150 feet per minute.

By using a constant speed and smooth continuous flow of material, the proper tension of the web can be more easily maintained, fewer adjustments of the machine parts are necessary and it is easier to maintain proper settings thereof. As a result, higher web speeds are possible, as are better folding characteristics of the material.

After the web leaves the draw rolls it is held against the drum by the suction therein. When the cutting and sealing wire contacts the web and while the wire is in the drum slot, the drum is rotating at its slow speed to insure ample time for thorough cutting and sealing of the material. The wire enters the slot and thereby passes beneath the periphery of the drum to insure complete severance of the material. After the wire is lifted from the drum slot, under the influence of the cam follower 115 and cam track 117, the speed of both the drum D and rotary cutting device C are increased until the next wire and slot are in alignment. This increased speed of the drum pulls the web taut as it issues from the draw rolls, because the area 85 on the drum of large perforations holds the material and the drum actually slips ahead of the web. In other words, there is relative movement between the drum and web, the amount of which is determined by the speed of the feed rolls, which consequently determines the length of the bag. That is to say, the slower the feed rolls operate, the shorter will be the bag because less material will be fed to the drum between adjacent cutting slots.

The finished bags B are conveyed by the drum to the suction belt which has perforations sufficiently large and of a sufficient suction effect to cause the bags to be removed from the drum. The suction chamber 126 is effective to cause the bags to adhere to the belt 120 until they reach the cut-off wall 128. The bags then accumulate in a pile on the take-away belt until the latter is moved by the fluid motor 138.

Various modes of carrying out the invention are contemplated as being within the scope of the following claims particularly pointing out and distinctly claiming the subject matter which is regarded as the invention.

I claim:

1. In a machine for making bags of flexible and heat sealable material, the combination comprising, a perforated and cylindrical suction drum rotatably mounted in said machine, means to rotate said drum in one direction at alternately fast and slow speeds, means to feed a continuous web of flexible and heat sealable material at a constant rate of speed to said drum as the latter rotates, means to create a suction effect within said drum to hold said web on the drum periphery, said drum having back up members circumferentially spaced therearound, a rotary cutting and sealing device mounted adjacent said drum for movement at alternately fast and slow speeds in timed relationship therewith, said device having heated means adapted to periodically contact said back up members when the drum is rotating at said slow speed and thereby cut and seal the web held by said drum so as to form individual bags, and a perforated suction belt having a flight contacting another portion of said drum and moving in the same general direction therewith for removing said bags from said drum by suction.

2. A machine for making bags of flexible and heat sealable material comprising, a perforated and cylindrical suction drum rotatably mounted in said machine, means to rotate said drum in one direction at alternately fast and slow speeds, means to feed a continuous web of flexible and heat sealable material onto said drum as the latter rotates, means to create a suction effect within said drum to hold said web on the drum periphery, and a cutting and sealing device mounted adjacent said drum for movement in timed relationship therewith, said device having heated means adapted to contact said drum when the latter is rotating at said slow speed and thereby cut and seal the web held by said drum.

3. In a machine for making bags of flexible and heat sealable material, the combination comprising, a perforated and cylindrical suction drum rotatably mounted in said machine, means to rotate said drum in one direction at alternately fast and slow speeds, means to feed a continuous web of flexible and heat sealable material onto said drum as the latter rotates, means to create a suction effect within said drum to hold said web on the drum periphery, and a rotary cutting and sealing device mounted adjacent said drum for synchronized rotation in timed relationship therewith, said device having heated means adapted to contact said drum when the latter is rotating at said slow speed and thereby cut and seal the web held by said drum.

4. In a machine for making bags of flexible and heat sealable material, the combination comprising a perforated and cylindrical suction drum rotatably mounted in said machine, means to rotate said drum in one direction at alternately fast and slow speeds, means to feed a continuous web of flexible and heat sealable material at a constant rate of speed to said drum as the latter rotates, means to create a suction effect within said drum to hold said web on the drum periphery, that portion of said web located between said feed means and said drum becoming slack when said drum rotates at said slow speed and becoming taut due to the pulling action of the drum on said web when said drum rotates at said fast speed, and a rotary cutting and sealing device mounted adjacent said drum for rotation in timed relationship therewith, said device having heated means adapted to contact said drum when the latter is rotating at said slow speed and thereby cut and seal the web held by said drum.

5. In a machine for making bags of flexible and heat sealable material, the combination comprising, a perforated and cylindrical suction drum rotatably mounted in said machine, means to rotate said drum in one direction at alternately fast and slow speeds, means to feed a continuous web of flexible and heat sealable material onto said drum as the latter rotates, means to create a suction effect within said drum to hold said web on the drum periphery, a rotary cutting and sealing device mounted adjacent one portion of said drum for rotation in timed relationship therewith, said device having heated means adapted to contact said drum when the latter is rotating at said slow speed and thereby cut and seal the web held by said drum so as to form individual bags, and a perforated suction belt having a flight contacting another portion of said drum and moving in the same general direction therewith for removing said bags from said drum by suction.

6. A bag making machine comprising, a perforated and cylindrical suction drum rotatably mounted in said machine, means to rotate said drum in one direction at alternately fast and slow speeds, means to feed a continuous web of flexible and heat sealable material to said drum, means to create a suction effect within said drum to hold said web thereon, said drum having back up members circumferentially spaced therearound, rotary cutting and sealing means mounted for movement at alternately fast and slow speeds in timed relationship with said drum for periodically contacting said members during the period of said slow speed to thereby cut and seal the web held on said drum and form individual bags on said drum.

7. A bag making machine comprising in combination, a perforated suction drum rotatably mounted in said machine, means for feeding a continuous web of flexible and heat sealable material onto said drum at a preselected constant rate of speed, shiftable heating means for periodically contacting said drum to thereby cut and seal the web held by said drum, adjustable drive means adapted to rotate said drum in one direction at alternately fast and slow speeds and also to shift said heating means in synchronism with said drum, and variable speed drive means for operating said feeding means selectively at different constant speeds, said drive means including an adjustable power transmitting means for momentarily changing the speed of said feeding means to thereby shift the position of said material in respect to said heating means.

8. In a machine for making bags of flexible and heat sealable material, the combination comprising a perforated suction drum rotatably mounted in said machine, means for feeding a continuous web of flexible and heat sealable material onto said drum at a constant rate of speed, a rotary cutting and sealing device mounted adjacent said drum and having heating means for periodically contacting said drum to thereby cut and seal the web held by said drum, adjustable drive means adapted to rotate said drum in one direction at alternately fast and slow speeds and also rotate said device in synchronism with said drum, and variable speed drive means for operating said feeding means selectively at different constant speeds, said drive means including an adjustable power transmitting means for momentarily changing the speed of said feeding means to thereby shift the position of said material in respect to said cutting and sealing device.

9. A flexible bag making machine comprising in combination, a perforated suction drum rotatably mounted in said machine, means for feeding a continuous web of heat sealable material onto said drum at a constant rate of speed, heating means shiftably mounted adjacent said drum for periodically cutting and sealing the web held by said drum, adjustable drive means adapted to rotate said drum in one direction at alternately fast and slow speeds and also shift said heating means in synchronism with said drum, variable speed drive means for operating said feeding means selectively at different constant speeds, and an adjustable belt-operated compensator for momentarily changing the speed of said feeding means to thereby shift the position of said material in respect to said heating means.

10. A flexible bag making machine comprising in combination, a perforated suction drum rotatably mounted in said machine, means for feeding a continuous web of heat sealable material onto said drum at a constant rate of speed, heating means shiftably mounted adjacent said drum for periodically cutting and sealing the web held by said drum, adjustable drive means adapted to rotate said drum in one direction at alternately fast and slow speeds and also shift said heating means in synchronism with said drum, variable speed drive means for operating said feeding means selectively at different constant speeds, an adjustable belt-operated compensator for momentarily changing the speed of said feeding means to thereby shift the position of said material in respect to said heating means, said compensator including an input shaft and a coaxial output shaft, a first pulley secured to said input shaft, a second pulley secured to said output shaft, an adjustable member rotatably mounted on said shafts and having a stub shaft rotatably mounted thereon, third and fourth pulleys fixed to said stub shaft, said first and third pulleys being of the same size and having a belt drivingly engaged therearound, said second pulley being larger than said first pulley and said fourth pulley being smaller than said first pulley, another belt of equal size to the first said belt and drivingly engaged around said second and fourth pulleys, and means to rotate said member in either direction around said input and output shafts to thereby vary the speed of the latter.

References Cited in the file of this patent

UNITED STATES PATENTS

| | | |
|---|---|---|
| 1,028,009 | Fancher | May 28, 1912 |
| 2,028,145 | Coty | Jan. 21, 1936 |
| 2,185,647 | Penn et al. | Jan. 2, 1940 |
| 2,430,798 | Alexander | Nov. 11, 1947 |
| 2,737,859 | Allison et al. | Mar. 13, 1956 |

FOREIGN PATENTS

| | | |
|---|---|---|
| 1,093,687 | France | Nov. 24, 1954 |